US011668996B1

(12) United States Patent
Devine et al.

(10) Patent No.: US 11,668,996 B1
(45) Date of Patent: Jun. 6, 2023

(54) LENS MOUNTED CAP WITH OPENING AND CLOSING MECHANISM

(71) Applicant: Holdland LLC, South Jordan, UT (US)

(72) Inventors: Bradley Hogan Rivas Devine, South Jordan, UT (US); Beau Oyler, Salt Lake City, UT (US); Luke Gonos, Salt Lake City, UT (US)

( * ) Notice: Subject to any disclaimer, the term of this patent is extended or adjusted under 35 U.S.C. 154(b) by 0 days.

(21) Appl. No.: 17/729,255

(22) Filed: Apr. 26, 2022

Related U.S. Application Data

(63) Continuation-in-part of application No. 17/565,513, filed on Dec. 30, 2021, now Pat. No. 11,454,865.

(51) Int. Cl.
*G03B 11/04* (2021.01)
*G02B 23/16* (2006.01)

(52) U.S. Cl.
CPC .......... *G03B 11/043* (2013.01); *G03B 11/041* (2013.01); *G02B 23/16* (2013.01)

(58) Field of Classification Search
CPC .......... G03B 9/02; G03B 9/06; G03B 11/043; G03B 11/045; G03B 11/041; G03B 17/12; G02B 5/005; G02B 23/16
See application file for complete search history.

(56) References Cited

U.S. PATENT DOCUMENTS

| 4,264,178 A | * | 4/1981 | Muryoi | G03B 9/06 396/509 |
| 4,974,001 A | * | 11/1990 | Watanabe | G03B 9/06 396/510 |
| D860,293 S | * | 9/2019 | Lowell | D16/219 |
| 2018/0313635 A1 | * | 11/2018 | Lowell | F41G 11/00 |

FOREIGN PATENT DOCUMENTS

| CN | 100419566 C | * | 9/2008 | .............. F21V 11/10 |
| FR | 3117620 A1 | * | 6/2022 | |
| WO | WO-2019124028 A1 | * | 6/2019 | .............. G02B 7/02 |

* cited by examiner

*Primary Examiner* — Christopher E Mahoney

(57) ABSTRACT

A lens cap device, comprising a base configured as inner ring; an outer ring configured to be rotatable relative to the base; and a plurality of curved blades rotatably connected to the base and slidably connected to the outer ring, wherein the plurality of curved blades is configured to function as an iris; and wherein when the outer ring is rotated, each blade in the plurality of curved blades travels from an outer position that defines an opening to an inward position that defines a closure.

19 Claims, 12 Drawing Sheets

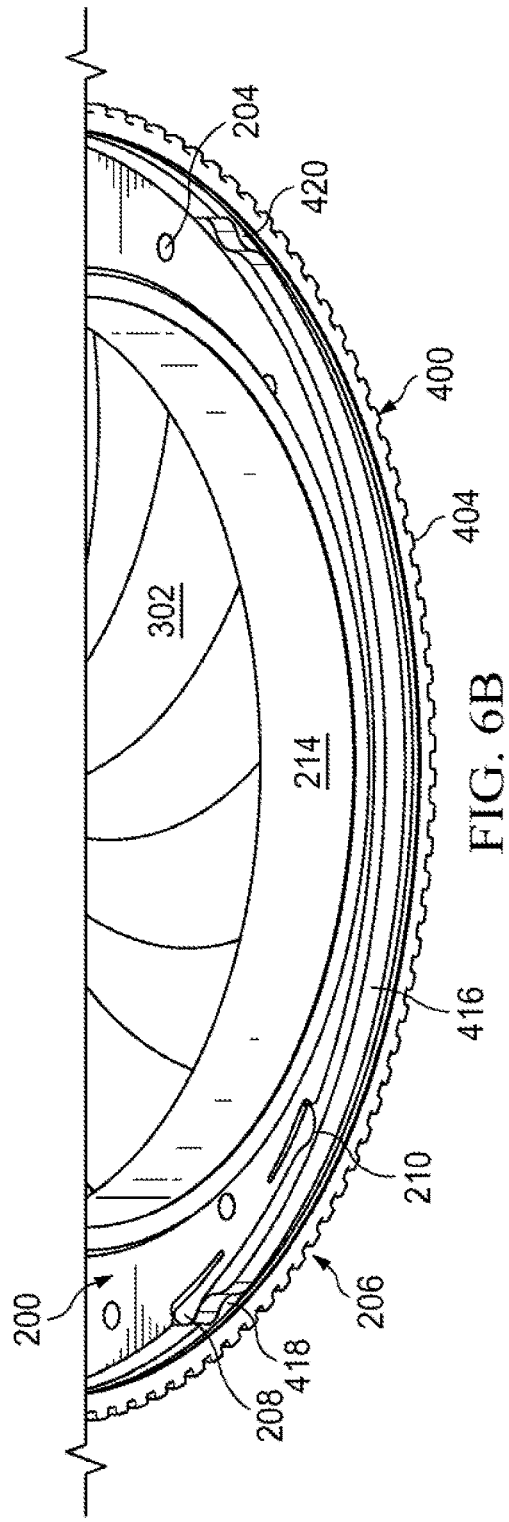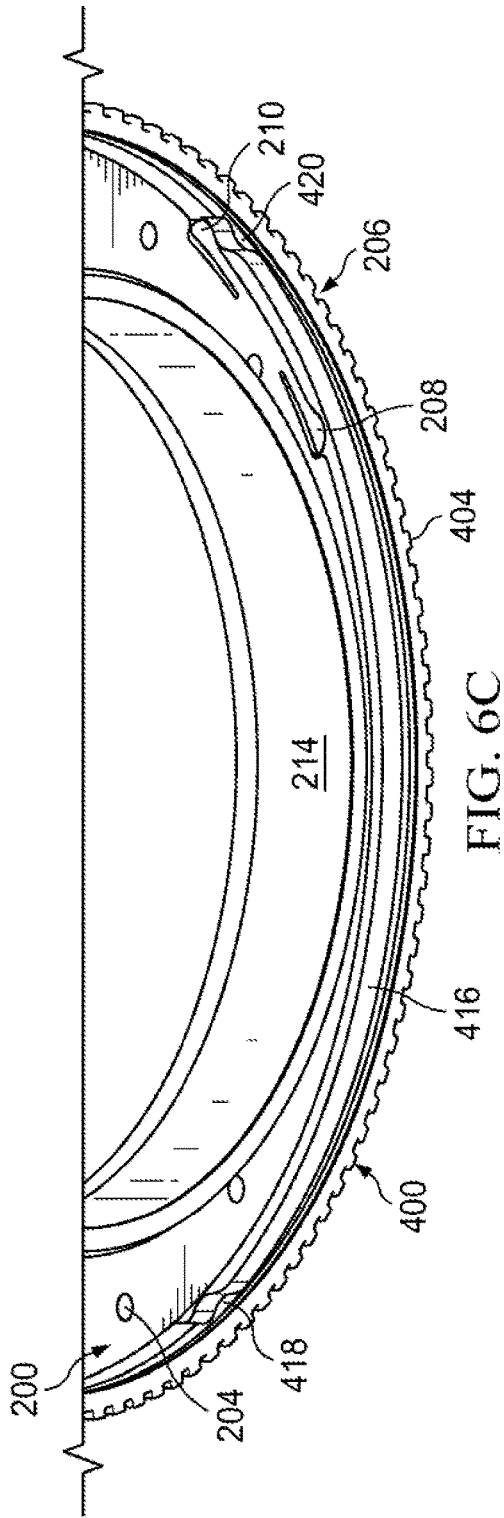

LENS MOUNTED CAP WITH OPENING AND CLOSING MECHANISM

CROSS-REFERENCE TO RELATED APPLICATIONS

This patent application is a continuation-in-part of U.S. patent application Ser. No. 17/565,513 filed on Dec. 30, 2021 and entitled "Dynamic Lens Cap", the disclosure of which is hereby incorporated by reference herein in its entirety and made part of the present U.S. utility patent application for all purposes.

BACKGROUND

The disclosed technology relates in general to protective coverings for camera lenses and other optical devices, and more specifically to lens cap or lens cap assembly that can be mounted directly on a camera lens and that includes an iris-type opening and closing mechanism that makes removing the lens cap assembly from the lens unnecessary when the camera is in use.

Certain types of cameras and other optical devices often include cylindrical lenses that are connected at one end thereof to the body of the camera. The opposite end of the lens is typically glass or another material with properties similar to glass that has been manufactured to confer specific optical properties to the lens. Because the integrity and clarity of the lens material is important to proper functionality of the lens, measures must be taken to avoid scratching, marring, or damaging the lens material, particularly when the camera or other optical device is being stored or transported between uses. Accordingly, most lenses are capable of receiving a removable solid cap that provides protection to the lens. While effective for their intended purpose, most lens caps employ mechanical means, such as threads or spring-loaded clips, or simply a friction fit, to secure the lens cap to the lens in a removable manner. When the lens cap is removed, it is set typically aside while the camera or other optical device is in use and is frequently misplaced, lost, or forgotten. If any of these events occurs, the lens cap is no longer available for use in protecting the material of the lens and significant damage can occur thereto when the camera or other optical device is placed in storage or is transported from one place to another. Accordingly, there is an ongoing need for a lens cap or lens cap assembly that can be semi-permanently mounted on a camera lens or other optical device and that includes an opening and closing mechanism that does not require either partial or complete removal of the lens cap assembly when the camera or other optical device is in use.

SUMMARY

The following provides a summary of certain example embodiments and implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

A first example embodiment of the disclosed technology provides a lens cap device, comprising a base configured as an inner ring; an outer ring configured to be rotatable relative to the base; and a plurality of curved blades rotatably connected to the base and slidably connected to the outer ring, wherein the plurality of curved blades is configured to function as an iris; and wherein when the outer ring is rotated, each blade in the plurality of curved blades travels from an outer position that defines an opening to an inward position that defines a closure.

The device may further comprise a locking ring to which the base and outer ring are connected. In an example implementation of the first embodiment, the base further includes a plurality of apertures formed therein at predetermined locations relative to one another, each blade in the plurality of curved blades further includes a pin formed on a lower or bottom surface thereof, and each pin engages an aperture in a rotatable manner. In an example implementation of the first embodiment, the outer ring further comprises a plurality of y-shaped channels formed therein and a plurality of I-shaped channels formed therein, each blade in the plurality of curved blades further includes a pin formed on a upper or top surface thereof, a predetermined number of the pins engage a y-shaped channel in a slidable manner, and a predetermined number of the pins engage an !-shaped channel in a slidable manner. The plurality of curved blades may include 16 blades, the plurality of y-shaped channels may include 12 y-shaped channels, and the plurality of I-shaped channels may include 4 I-shaped channels. In an example implementation of the first embodiment, the base further includes a cutout region formed therein, the outer ring further includes a hard stop formed thereon, and when the outer ring is rotated the hard stop encounters an edge of the cutout region and prevents further rotation of the outer ring. In an example implementation of the first embodiment, the base further includes a clip having a first clip portion and a second clip portion, the outer ring further includes a curved channel formed therein having a first detent at one end thereof and a second detent at the other end thereof, when the outer ring is rotated in a first direction, the clip travels in the curved channel and the first clip portion detectably engages the first detent, and wherein when the outer ring is rotated in a second direction opposite to the first direction, the clip travels in the curved channel and the second clip portion detectably engages the second detent. The base may further include a threaded region configured to be attached to a threaded lens and the outer ring may further include a threaded region configured to receive a threaded lens filter.

A second example embodiment of the disclosed technology provides a lens cap device, comprising a base configured as inner ring, wherein the base further includes a threaded region configured to be attached to a threaded lens; an outer ring configured to be rotatable relative to the base, wherein the outer ring further includes a threaded region configured to receive a threaded lens filter; and a plurality of curved blades rotatably connected to the base and slidably connected to the outer ring, wherein the plurality of curved blades is configured to function as an iris, and wherein when the outer ring is rotated, each blade in the plurality of curved blades travels from an outer position that defines an opening to an inward position that defines a closure; and a locking ring to which the base and outer ring are connected.

In an example implementation of the second embodiment, the base further includes a plurality of apertures formed therein at predetermined locations relative to one another, each blade in the plurality of curved blades further includes a pin formed on a lower or bottom surface thereof, and each pin engages an aperture in a rotatable manner. In an example implementation of the second embodiment, the outer ring further comprises a plurality of y-shaped channels formed therein and a plurality of I-shaped channels formed therein, each blade in the plurality of curved blades further includes a pin formed on a upper or top surface thereof, a predetermined number of the pins engage a y-shaped channel in a slidable manner, and a predetermined number of the pins engage an I-shaped channel in a slidable manner. The plurality of curved blades may include 16 blades, the plurality of y-shaped channels may include 12 y-shaped channels, and the plurality of I-shaped channels may include 4 I-shaped channels. In an example implementation of the second embodiment, the base further includes a cutout region formed therein, the outer ring further includes a hard stop formed thereon, and when the outer ring is rotated the hard stop encounters an edge of the cutout region and prevents further rotation of the outer ring. In an example implementation of the second embodiment, the base further includes a clip having a first clip portion and a second clip portion, the outer ring further includes a curved channel formed therein having a first detent at one end thereof and a second detent at the other end thereof, when the outer ring is rotated in a first direction, the clip travels in the curved channel and the first clip portion detectably engages the first detent, and wherein when the outer ring is rotated in a second direction opposite to the first direction, the clip travels in the curved channel and the second clip portion detectably engages the second detent.

A third example embodiment of the disclosed technology provides a lens cap device, comprising a base configured as inner ring; an outer ring configured to be rotatable relative to the base; and a plurality of curved blades connected to the base and connected to the outer ring, wherein the base further includes a plurality of apertures formed therein at predetermined locations relative to one another, wherein each blade in the plurality of curved blades further includes a pin formed on a lower or bottom surface thereof, and wherein each pin engages an aperture in a rotatable manner; wherein the outer ring further comprises a plurality of y-shaped channels formed therein and a plurality of I-shaped channels formed therein, wherein each blade in the plurality of curved blades further includes a pin formed on a upper or top surface thereof, wherein a predetermined number of the pins engage a y-shaped channel in a slidable manner, and wherein a predetermined number of the pins engage an I-shaped channel in a slidable manner, wherein the plurality of curved blades is configured to function as an iris, and wherein when the outer ring is rotated, each blade in the plurality of curved blades travels from an outer position that defines an opening to an inward position that defines a closure.

In an example implementation of the third embodiment, the plurality of curved blades includes 16 blades, the plurality of y-shaped channels includes y-shaped 12 channels, and the plurality of I-shaped channels includes 4 channels. The device may further comprise a locking ring to which the base and outer ring are connected. In an example implementation of the third embodiment, the base further includes a clip having a first clip portion and a second clip portion, the outer ring further includes a curved channel formed therein having a first detent at one end thereof and a second detent at the other end thereof, when the outer ring is rotated in a first direction, the clip travels in the curved channel and the first clip portion detectably engages the first detent, and wherein when the outer ring is rotated in a second direction opposite to the first direction, the clip travels in the curved channel and the second clip portion detectably engages the second detent. The base may further include a threaded region configured to be attached to a threaded lens, and the outer ring may further include a threaded region configured to receive a threaded lens filter.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein:

FIG. 6B is a bottom perspective view of the circular threaded base and the circular outer ring depicting a clip formed on the outer edge of the threaded base, a first portion of which engages a first snap structure formed in the circular outer ring for creating an audible sound when the iris of the lens is in a closed position;

FIG. 6C is a bottom perspective view of the circular threaded base and the circular outer ring depicting the clip formed on the outer edge of the threaded base, a second portion of which engages a second snap structure formed in the circular outer ring for creating an audible sound when the iris of the lens is in an open position.

DETAILED DESCRIPTION

Figure 1:
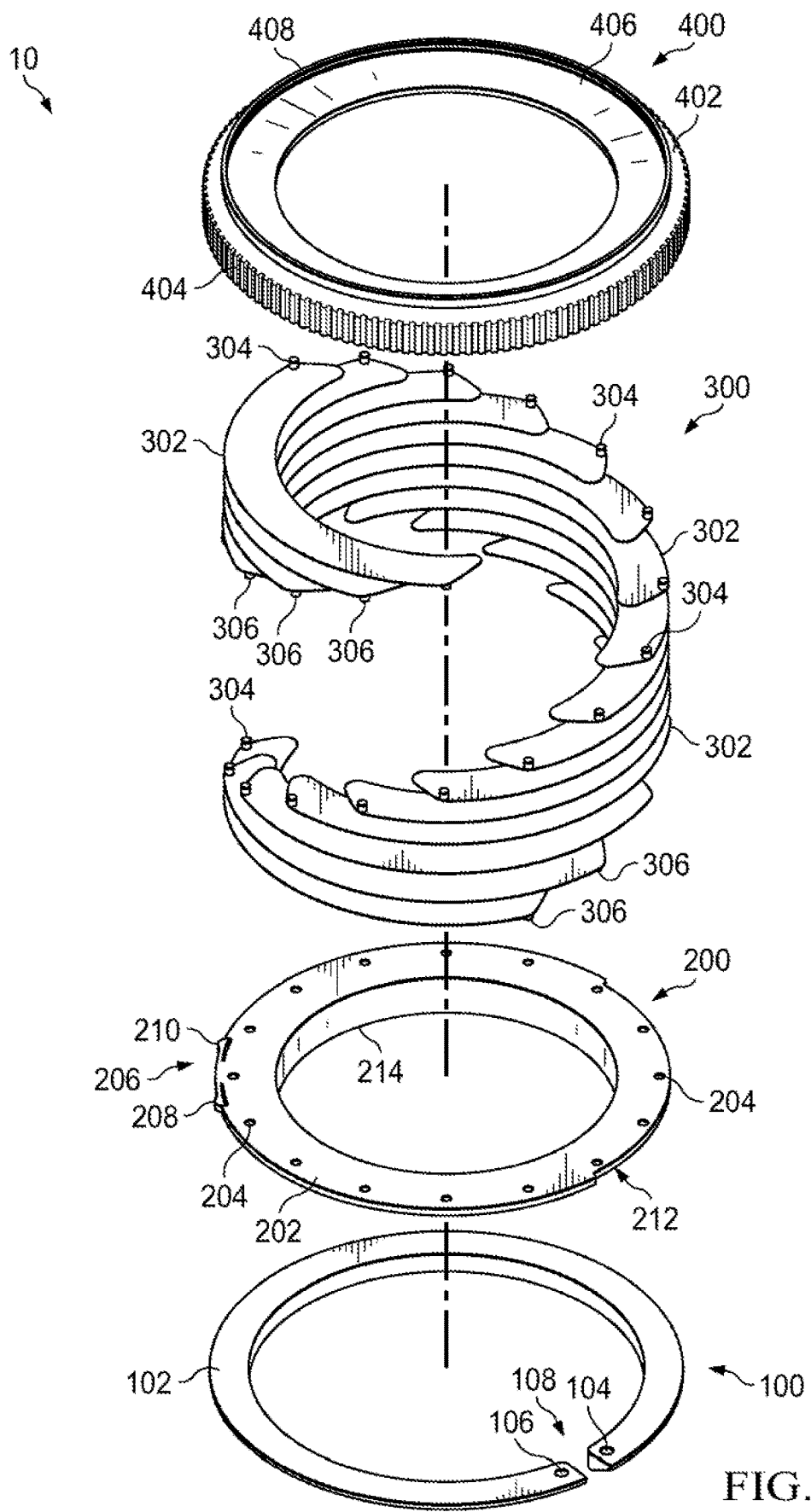
FIG. 1 depicts an example implementation of the disclosed lens cap assembly shown in an exploded configuration, wherein the lens cap includes a circular lock ring, a circular threaded base, an iris blade assembly, and a circular outer ring which is used to actuate (i.e., open and close) the lens cap when the lens cap is mounted on a camera lens.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example implementations of the disclosed system and device provide a lens cap or lens cap assembly that can be semi-permanently mounted on a camera lens or other optical device and that includes an opening and closing mechanism that does not require removal of the lens cap assembly when the lens, camera, or other optical device is in use. With reference to the Figures, FIG. 1 depicts an example implementation of the disclosed lens cap assembly shown in an exploded configuration, wherein lens cap 10 includes circular lock ring 100, circular threaded base 200, iris blade assembly 300, and circular, rotatable outer ring 400 that is used to actuate (i.e., open and close) assembled lens cap 10 when mounted on a camera lens or other optical device requiring a protective cap or closure. The components of lens cap 10 may be plastic, polymer, metal, a combination thereof, or any other suitable material or combination of suitable materials.

Figure 2A:
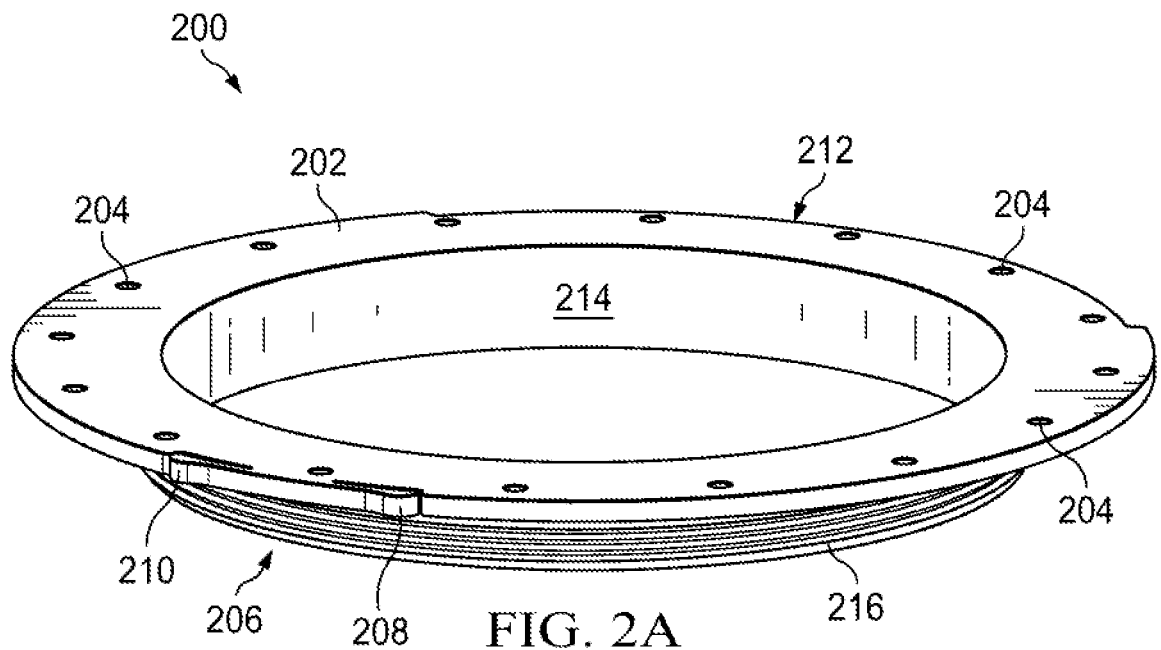
FIG. 2A is a top perspective view of the circular threaded base of FIG. 1.
Figure 2B:
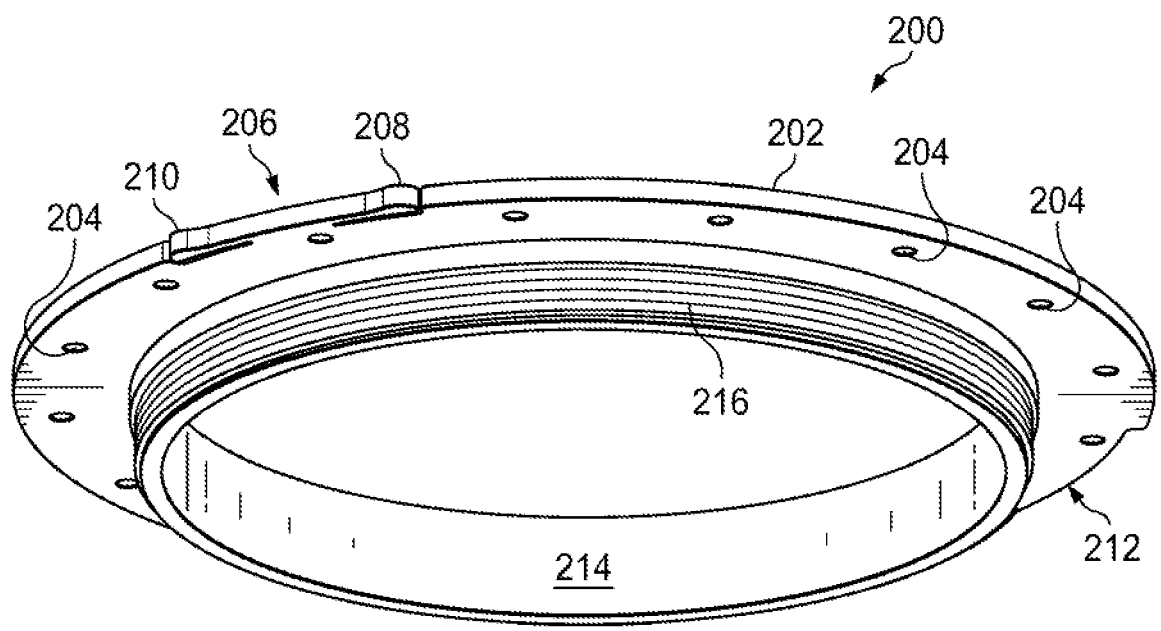
FIG. 2B is a bottom perspective view of the circular threaded base of FIG. 1.
Figure 2C:
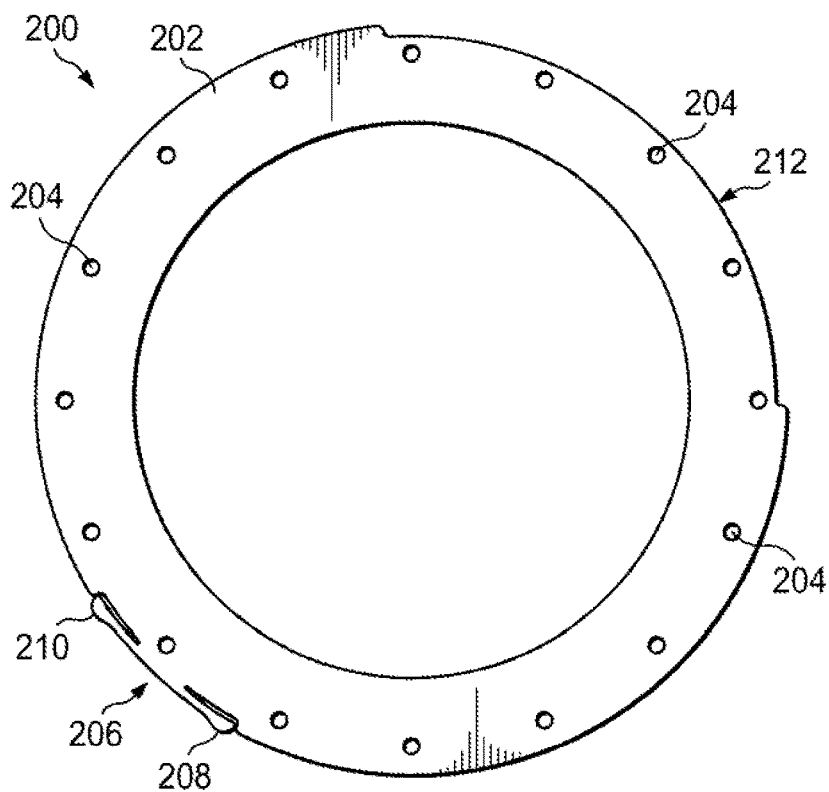
FIG. 2C is a top view of the circular threaded base of FIG. 1.

FIG. 2A provides a top perspective view of circular threaded base 200; FIG. 2B provides a bottom perspective view of circular threaded base 200; and FIG. 2C provides a top view of circular threaded base 200. Circular threaded base 200 includes upper surface 202; plurality of apertures 204 formed through the material of base 200; clip 206, which includes first clip portion 208 and second clip portion 210; cutout region 212; threaded region 214, which includes threads 216 (e.g., M82×0.75 thread), which are configured to connect to corresponding threads on a camera lens.

Figure 3A:
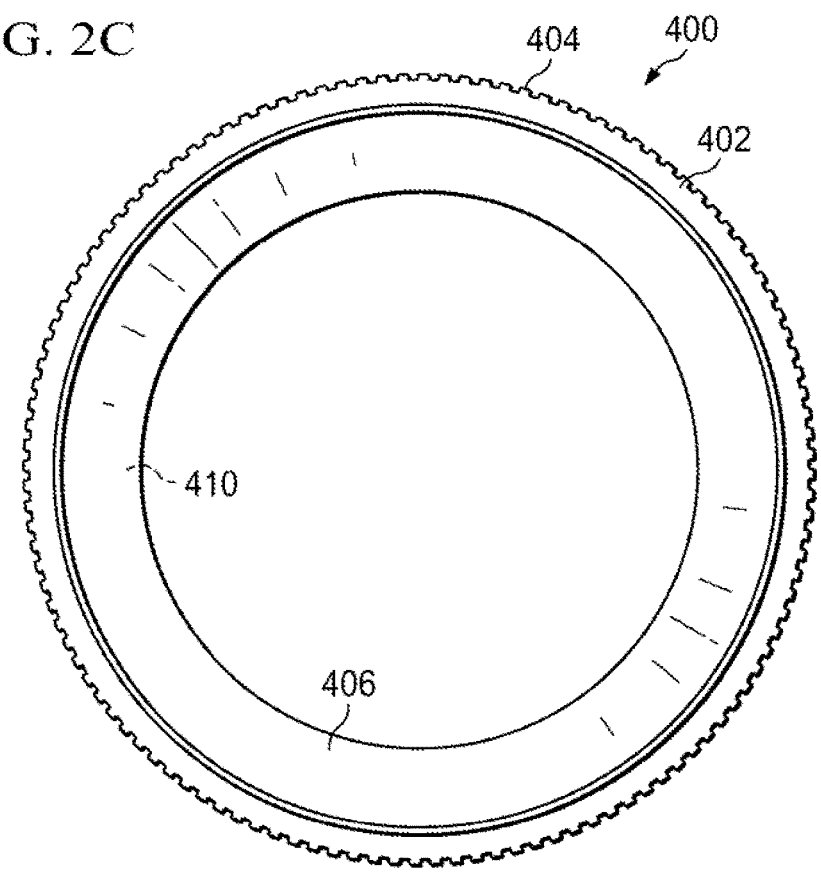
FIG. 3A is a top view of the circular outer ring of FIG. 1.
Figure 3B:
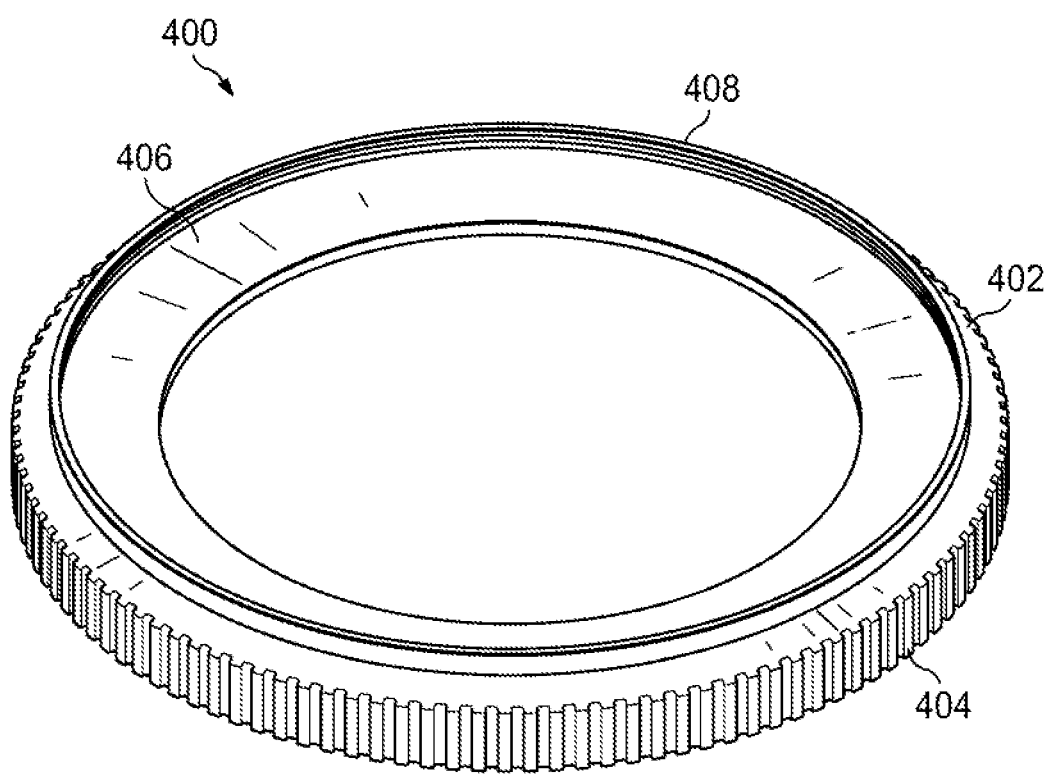
FIG. 3B is a top perspective view of the circular outer ring of FIG. 1.
Figure 3C:
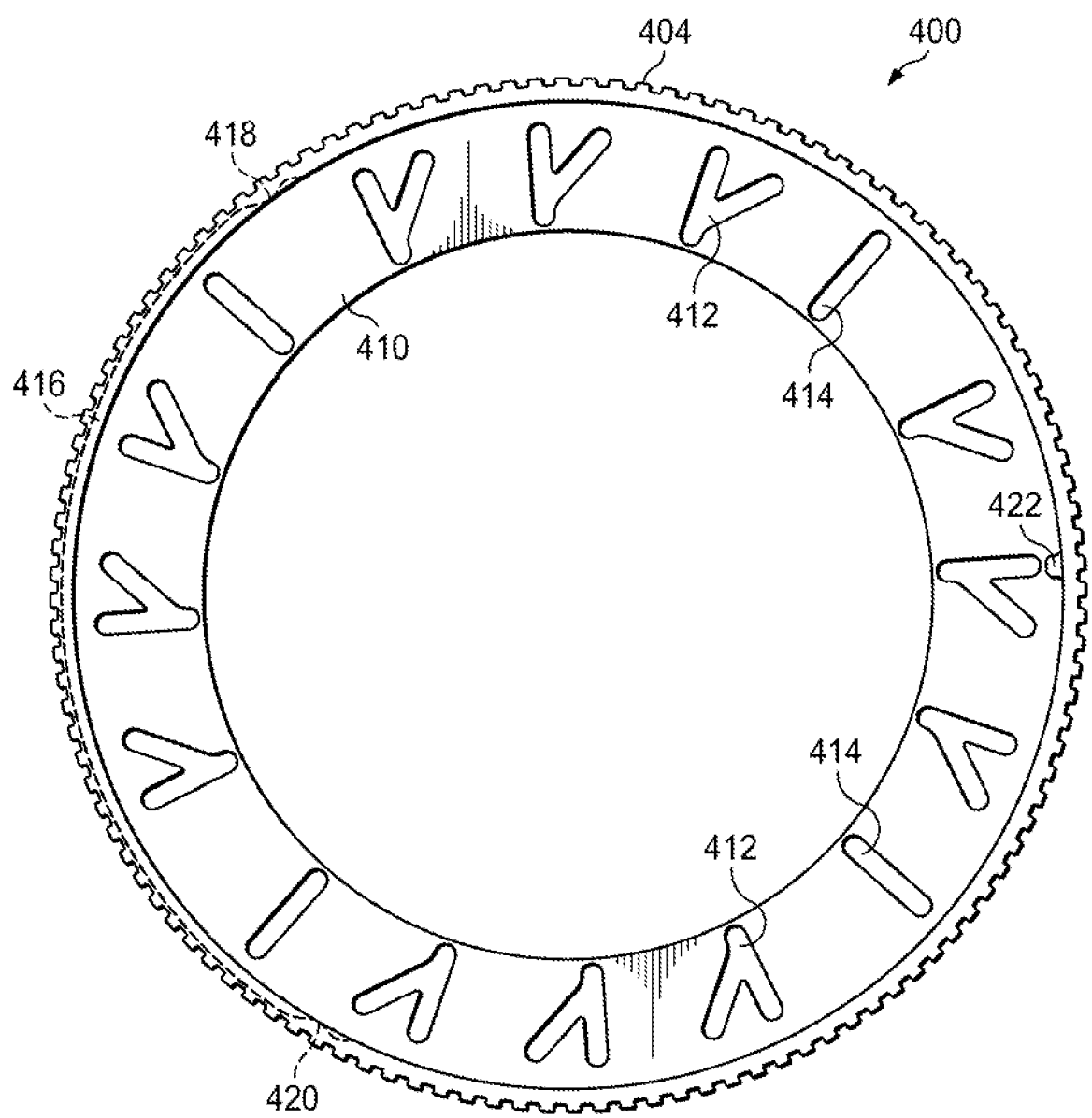
FIG. 3C is a bottom view of the circular outer ring of FIG. 1.

FIG. 3A provides a top view of circular outer ring 400; FIG. 3B provides a top perspective view of the circular outer ring 400; and FIG. 3C provides a bottom view of circular outer ring 400. Circular outer ring 400 includes outer portion 402, in which a plurality of ridges 404 are formed; inner portion 406; threaded region 408, which includes threads that are configured to receive corresponding threads on a lens filter; and lower surface 410. Lower surface 410 includes a plurality of lowercase "y-shaped" channels 412; a plurality of "I-shaped" (or straight) channels 414 (note: see FIG. 3C for the actual specific geometry of channels 412 and 414); curved channel 416, which is formed in the outer edge of lower surface 416; protrusion or detent 418 and protrusion or detent 420 located at opposite ends of channel 416; and hard stop 422.

Iris blade assembly 300 includes a plurality of curved iris blades 302, each having an upper blade pin 304 on one end of the blade and a lower blade pin 306 on the opposite end of the blade (see FIG. 1, which depicts the placement of pins 304 and 306 on each iris blade relative to each other). Circular lock ring 100 includes body 102; aperture 104; aperture 106; and gap 108 (see FIG. 1). Circular lock ring holds the components of the disclosed assembly together to create a functional lens cap 10.

Figure 4:
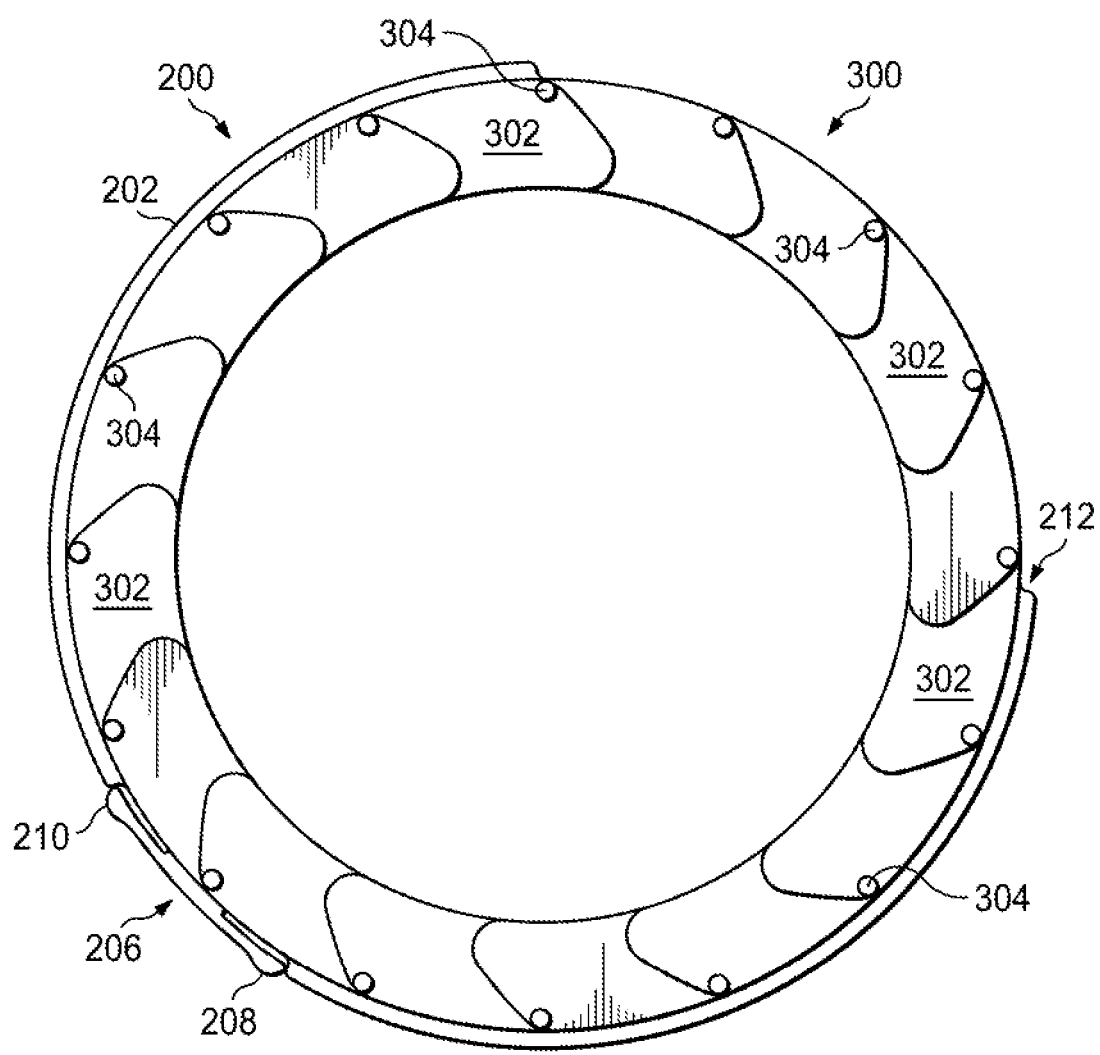
FIG. 4 is a top view of the iris blade assembly mounted on top of the circular threaded base, wherein the iris portion of the lens cap is depicted in an open position.

When lens cap 10 is assembled, each iris blade 302 is positioned on top of circular threaded base 200 in the overlapping manner shown in FIG. 4, which provides a top view of iris blade assembly 300 mounted on top of circular threaded base 200, wherein the iris portion of lens cap 10 is depicted in an open closed position. Each lower iris blade pin 306 is inserted, in a rotatable manner, into a corresponding aperture 204 in circular threaded base 200. Circular outer ring 400 is placed on top of iris blade assembly 300 and each upper iris blade pin 304 is positioned within either a y-shaped channel 412 or an I-shaped channel 414 in a slidable manner. As circular outer ring 400 is rotated, each upper iris blade pin 304 travels within its respective y-shaped channel 412 or I-shaped channel 414, resulting in the iris blades simultaneously rotating inward from the open position shown in FIG. 4 to a closed position (see FIG. 5C), thereby creating a solid cap for covering and protecting a lens or other optic. In an example implementation, sixteen iris blades are used, twelve y-shaped channels are used and four I-shaped channels are used. The twelve y-shaped channels 412 permit twelve of the iris blades 302 to move more slowly as the blades approach the center of the iris, and the four I-shaped channels 414 permit four of iris blades to move at a constant (normal) rate to close off the iris.

Figure 5A:
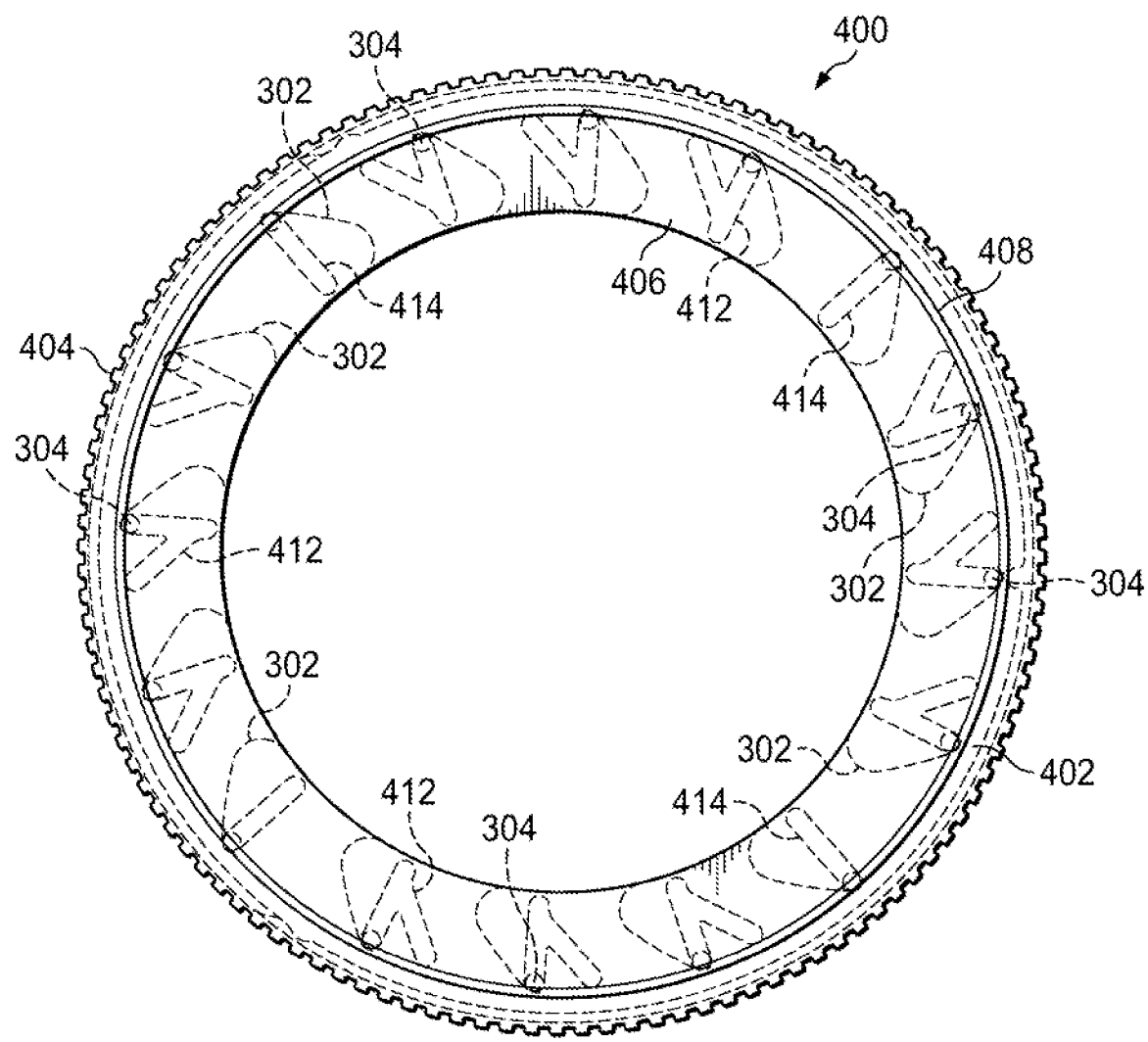
FIG. 5A is a top view of the circular outer ring mounted on top of the iris blade assembly showing the location of the pins on top of each iris blade within either a y-shaped channel or an I-shaped channel when the iris portion of the lens cap is in an open position.
Figure 5B:
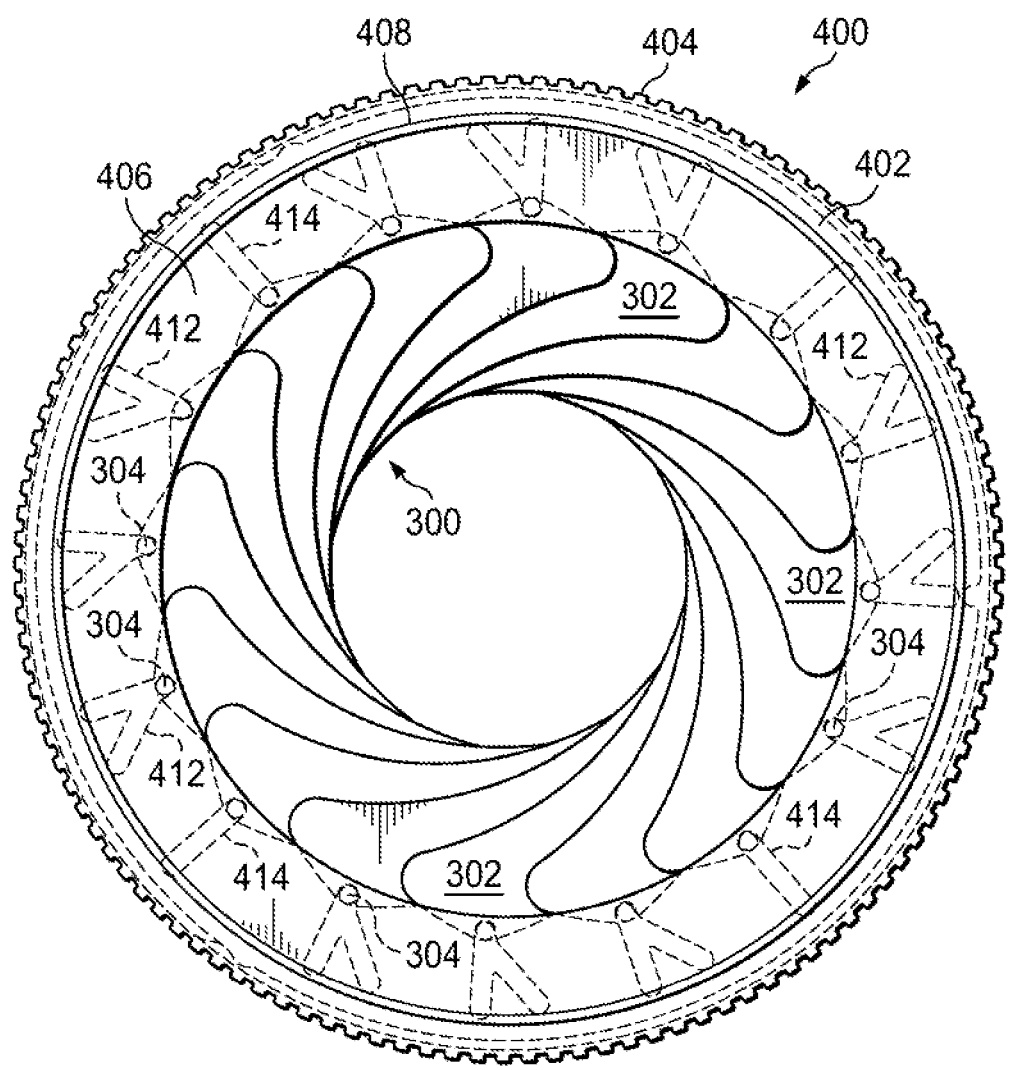
FIG. 5B is a top view of the circular outer ring mounted on top of the iris blade assembly showing the location of the pins on top of each iris blade within either a y-shaped channel or an I-shaped channel when the iris portion of the lens cap is in a partially closed position.
Figure 5C:
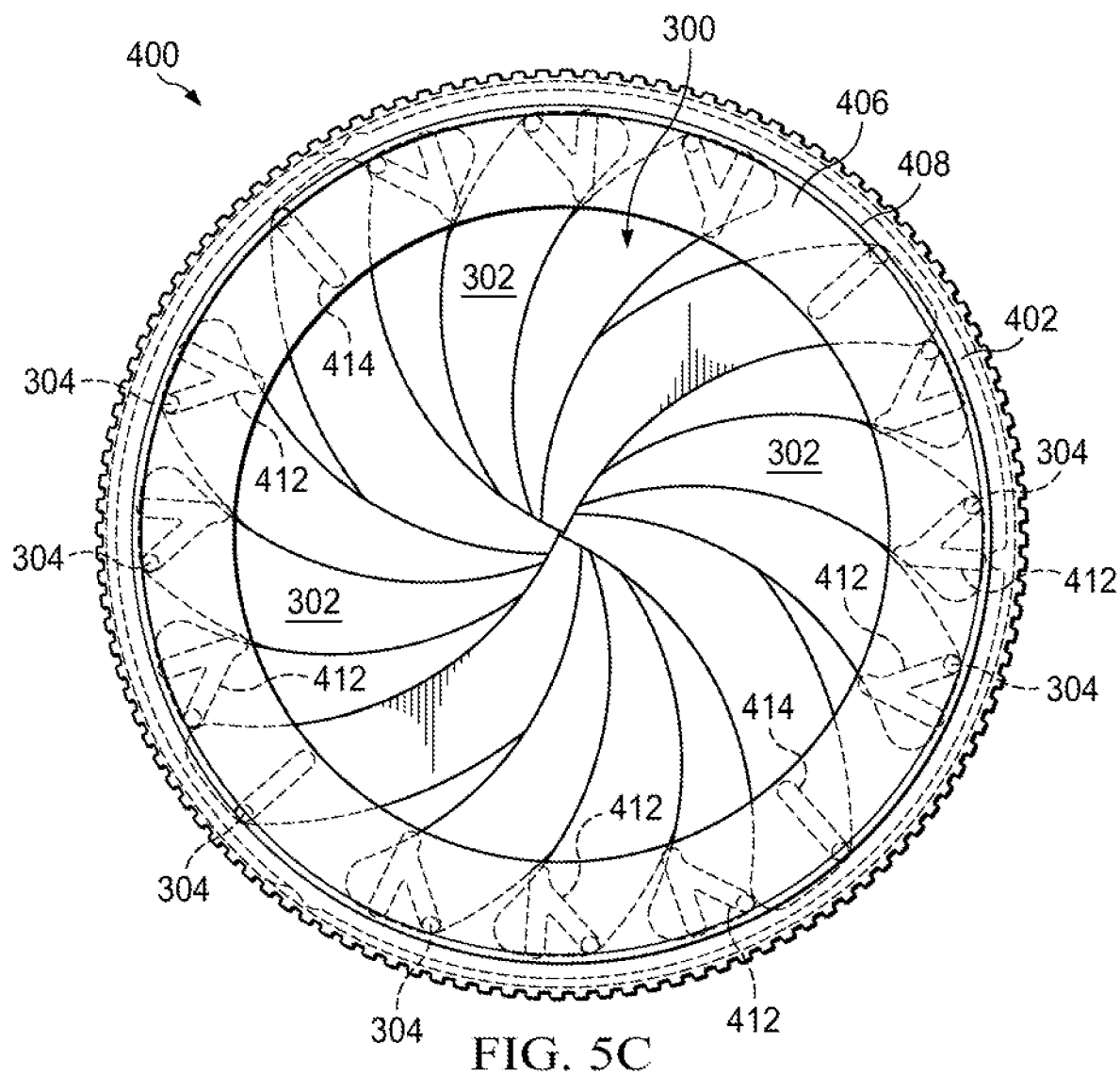
FIG. 5C is a top view of the circular outer ring mounted on top of the iris blade assembly showing the location of the pins on top of each iris blade within either a y-shaped channel or an I-shaped channel when the iris portion of the lens cap is in a closed position.

FIG. 5A provides a top view of circular outer ring 400 mounted on top of iris blade assembly 300 showing the location of the upper iris pins 304 within either a y-shaped channel or an I-shaped channel when the iris portion of lens cap 10 is in an open position. FIG. 5B provides a top view of circular outer ring mounted 400 on top of blade assembly 300 showing the location of upper iris pins 304 within either a y-shaped channel or an I-shaped channel when the iris portion of the lens cap is in a partially closed position. FIG.

5C provides a top view of circular outer ring 400 mounted on top of blade assembly 300 showing the location of upper iris pins 304 within either a y-shaped channel or an I-shaped channel when the iris portion of the lens cap is in a closed position.

Figure 6A:
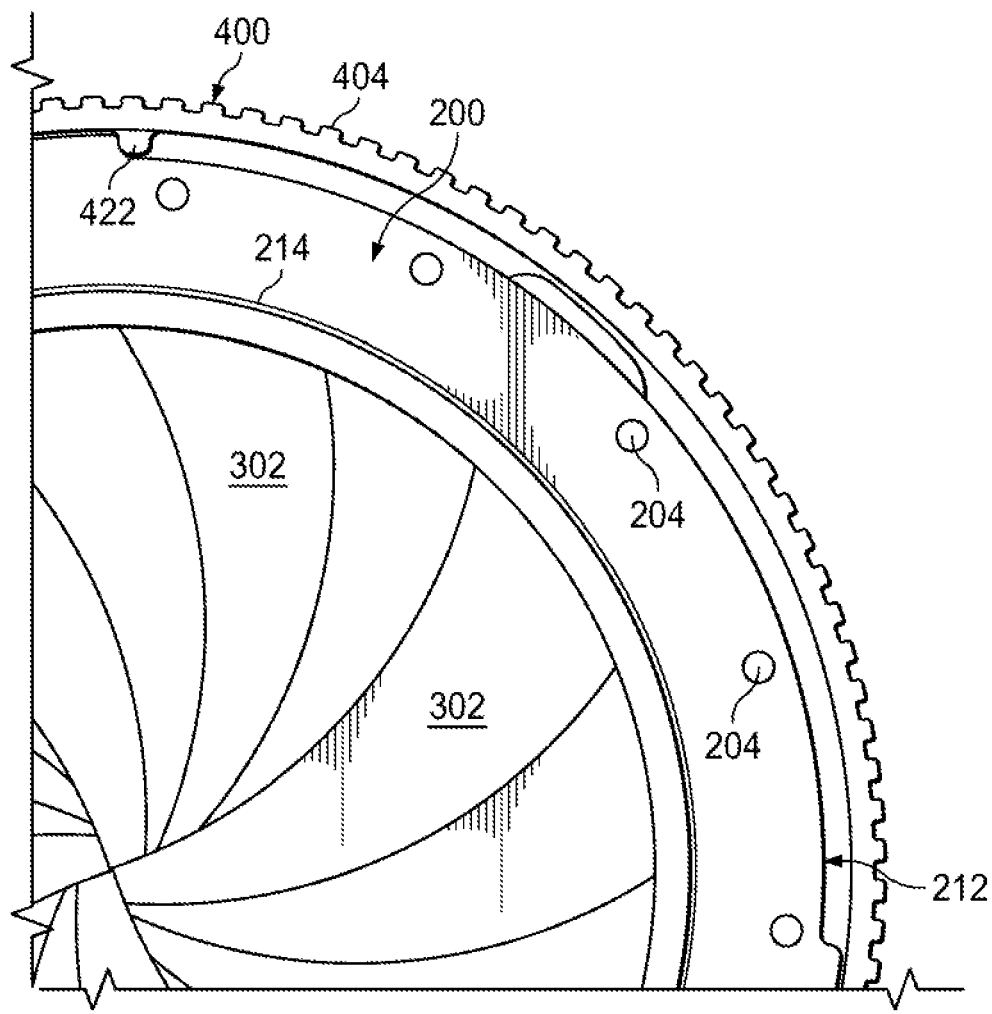
FIG. 6A is a bottom view of the circular threaded base, the iris blade assembly, and the circular outer ring shown in an assembled configuration and depicting a hard stop mechanism that controls the degree of rotation of the components relative to one another.
Figure 7:
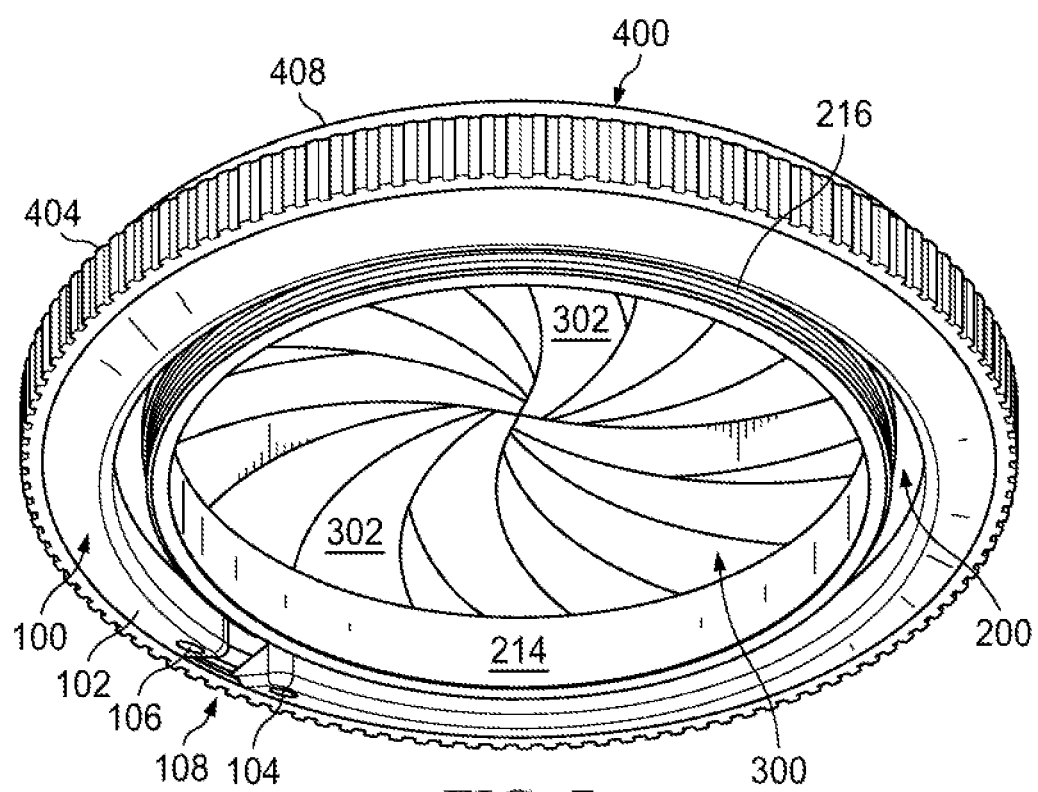
FIG. 7 is a bottom perspective view of the entire lens cap assembly depicting the iris portion of the lens in a closed position.

The example implementation of lens cap 10 shown in the Figures includes several structural features that assist the user of the device in properly opening and closing the iris feature of the cap. Circular threaded base includes clip 206, which includes first clip portion 208 and second clip portion 210; and cutout region 212. Circular outer ring 400 includes channel 416, which is formed on the outer edge of lower surface 416; detent 418 and detent 420; and hard stop 422. When circular outer ring 400 is rotated to close the iris, one edge of cutout region 212 encounters hard stop 422, which prevents over rotation of the of outer ring 400 and reduces the likelihood of damage to iris blade assembly 300 due to overtightening (see FIG. 6A). Additionally, when circular outer ring 400 is rotated to close the iris, clip 206 travels in channel 416 and first clip portion 208 engages dent 418, thereby creating an audible sound, such as a snap or click, which indicates to the user that the iris is in the closed position (see FIG. 6B) and that further rotation is unnecessary. Similarly, when outer ring 400 is rotated to open the iris, clip 206 again travels in channel 416 and second clip portion 210 engages dent 420, thereby creating an audible sound, such as a snap or click, which indicates to the user that the iris is in the open position (see FIG. 6C) and that further rotation is unnecessary.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:
1. A lens cap device, comprising:
 (a) a base configured as an inner ring;
 (b) an outer ring configured to be rotatable relative to the base;
 (c) a plurality of curved blades rotatably connected to the base and slidably connected to the outer ring,
  (i) wherein the plurality of curved blades is configured to function as an iris, and

(ii) wherein when the outer ring is rotated, each blade in the plurality of curved blades travels from an outer position that defines an opening to an inward position that defines a closure; and (d) a locking ring to which the base and outer ring are connected.

2. The device of claim 1,
(a) wherein the base further includes a plurality of apertures formed therein at predetermined locations relative to one another,
(b) wherein each blade in the plurality of curved blades further includes a pin formed on a lower or bottom surface thereof, and
(c) wherein each pin engages an aperture in a rotatable manner.

3. The device of claim 2,
(a) wherein the outer ring further comprises a plurality of y-shaped channels formed therein and a plurality of I-shaped channels formed therein,
(b) wherein each blade in the plurality of curved blades further includes a pin formed on a upper or top surface thereof,
(c) wherein a predetermined number of the pins engage a y-shaped channel in a slidable manner, and
(d) wherein a predetermined number of the pins engage an I-shaped channel in a slidable manner.

4. The device of claim 3, wherein plurality of curved blades includes 16 blades, wherein the plurality of y-shaped channels includes 12 y-shaped channels, and wherein the plurality of I-shaped channels includes 4 I-shaped channels.

5. The device of claim 1,
(a) wherein the base further includes a cutout region formed therein,
(b) wherein the outer ring further includes a hard stop formed thereon, and
(c) wherein when the outer ring is rotated, the hard stop encounters an edge of the cutout region and prevents further rotation of the outer ring.

6. The device of claim 1,
(a) wherein the base further includes a clip having a first clip portion and a second clip portion,
(b) wherein the outer ring further includes a curved channel formed therein having a first detent at one end thereof and a second detent at the other end thereof,
(c) wherein when the outer ring is rotated in a first direction, the clip travels in the curved channel and the first clip portion detectably engages the first detent, and
(d) wherein when the outer ring is rotated in a second direction opposite to the first direction, the clip travels in the curved channel and the second clip portion detectably engages the second detent.

7. The device of claim 1, wherein the base further includes a threaded region configured to be attached to a threaded lens.

8. The device of claim 1, wherein the outer ring further includes a threaded region configured to receive a threaded lens filter.

9. A lens cap device, comprising:
(a) a base configured as an inner ring, wherein the base further includes a threaded region configured to be attached to a threaded lens;
(b) an outer ring configured to be rotatable relative to the base, wherein the outer ring further includes a threaded region configured to receive a threaded lens filter; and
(c) a plurality of curved blades rotatably connected to the base and slidably connected to the outer ring,
(i) wherein the plurality of curved blades is configured to function as an iris, and
(ii) wherein when the outer ring is rotated, each blade in the plurality of curved blades travels from an outer position that defines an opening to an inward position that defines a closure; and (d) a locking ring to which the base and outer ring are connected.

10. The device of claim 9,
(a) wherein the base further includes a plurality of apertures formed therein at predetermined locations relative to one another,
(b) wherein each blade in the plurality of curved blades further includes a pin formed on a lower or bottom surface thereof, and
(c) wherein each pin engages an aperture in a rotatable manner.

11. The device of claim 10,
(a) wherein the outer ring further comprises a plurality of y-shaped channels formed therein and a plurality of I-shaped channels formed therein,
(b) wherein each blade in the plurality of curved blades further includes a pin formed on a upper or top surface thereof,
(c) wherein a predetermined number of the pins engage a y-shaped channel in a slidable manner, and
(d) wherein a predetermined number of the pins engage an I-shaped channel in a slidable manner.

12. The device of claim 11, wherein plurality of curved blades includes 16 blades, wherein the plurality of y-shaped channels includes 12 y-shaped channels, and wherein the plurality of I-shaped channels includes I-shaped channels.

13. The device of claim 9,
(a) wherein the base further includes a cutout region formed therein,
(b) wherein the outer ring further includes a hard stop formed thereon, and
(c) wherein when the outer ring is rotated, the hard stop encounters an edge of the cutout region and prevents further rotation of the outer ring.

14. The device of claim 9,
(a) wherein the base further includes a clip having a first clip portion and a second clip portion,
(b) wherein the outer ring further includes a curved channel formed therein having a first detent at one end thereof and a second detent at the other end thereof,
(c) wherein when the outer ring is rotated in a first direction, the clip travels in the curved channel and the first clip portion detectably engages the first detent, and
(d) wherein when the outer ring is rotated in a second direction opposite to the first direction, the clip travels in the curved channel and the second clip portion detectably engages the second detent.

15. A lens cap device, comprising:
(a) a base configured as an inner ring;
(b) an outer ring configured to be rotatable relative to the base; and
(c) a plurality of curved blades connected to the base and connected to the outer ring,
(i) wherein the base further includes a plurality of apertures formed therein at predetermined locations relative to one another, wherein each blade in the plurality of curved blades further includes a pin formed on a lower or bottom surface thereof, and wherein each pin engages an aperture in a rotatable manner, (ii) wherein the outer ring further comprises a plurality of y-shaped channels formed therein and a plurality of I-shaped channels formed therein, wherein each blade in the plurality of curved blades further includes a pin formed on a upper or top surface thereof, wherein a predetermined number of the pins engage a y-shaped channel in a slidable manner, and wherein a predetermined number of the pins engage an I-shaped channel in a slidable manner, (iii) wherein the plurality of curved blades is configured to function as an iris, and (iv) wherein when the outer ring is rotated, each blade in the plurality of curved blades travels from an outer position that defines an opening to an inward position that defines a closure.

16. The device of claim 15, wherein plurality of curved blades includes 16 blades, wherein the plurality of y-shaped channels includes 12 y-shaped channels, and wherein the plurality of I-shaped channels includes 4 I-shaped channels.

17. The device of claim 15, further comprising a locking ring to which the base and outer ring are connected.

18. The device of claim 15,
(a) wherein the base further includes a clip having a first clip portion and a second clip portion,
(b) wherein the outer ring further includes a curved channel formed therein having a first detent at one end thereof and a second detent at the other end thereof,
(c) wherein when the outer ring is rotated in a first direction, the clip travels in the curved channel and the first clip portion detectably engages the first detent, and
(d) wherein when the outer ring is rotated in a second direction opposite to the first direction, the clip travels in the curved channel and the second clip portion detectably engages the second detent.

19. The device of claim 15, wherein the base further includes a threaded region configured to be attached to a threaded lens, and wherein the outer ring further includes a threaded region configured to receive a threaded lens filter.

\* \* \* \* \*